No. 663,449. Patented Dec. 11, 1900.
T. LEBIEDZINSKI.
HOG SCRAPING MACHINE.
(Application filed Apr. 28, 1900.)
(No Model.) 3 Sheets—Sheet 2.
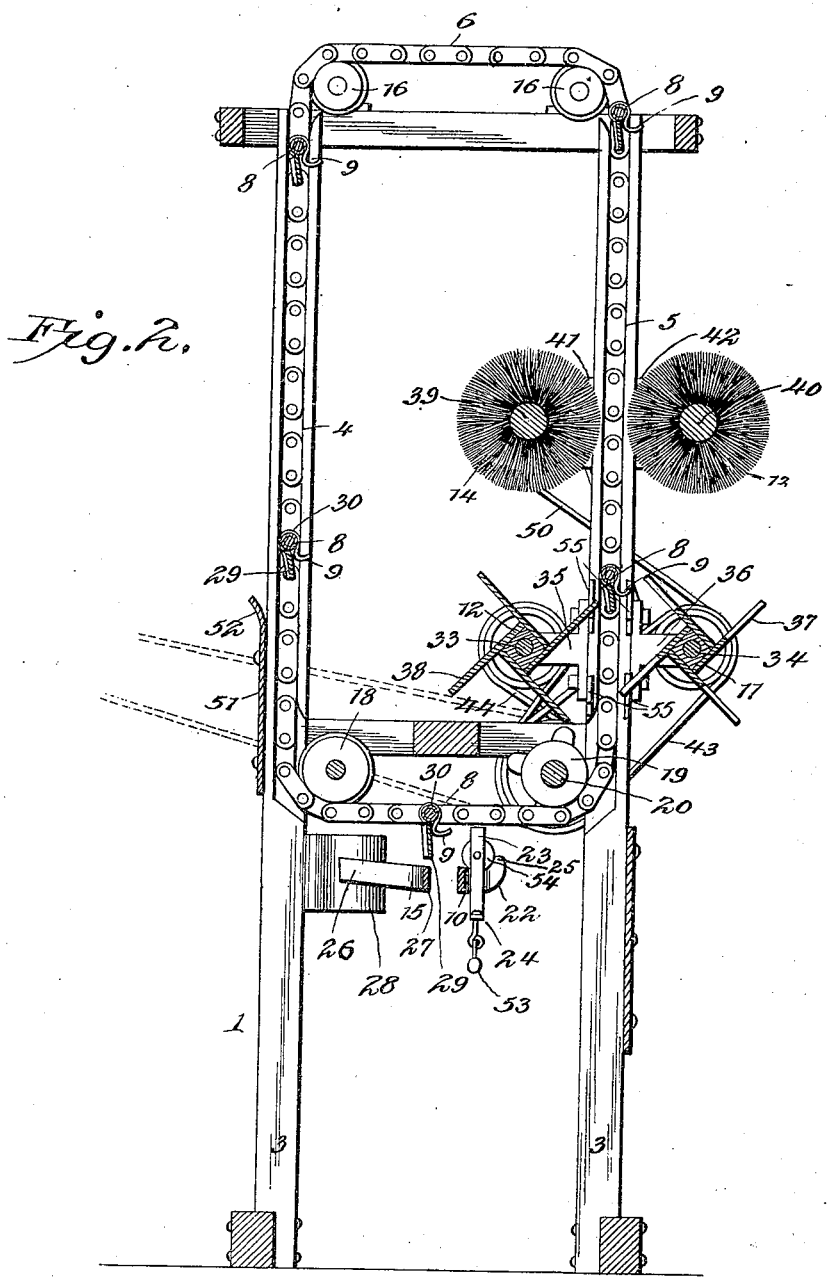

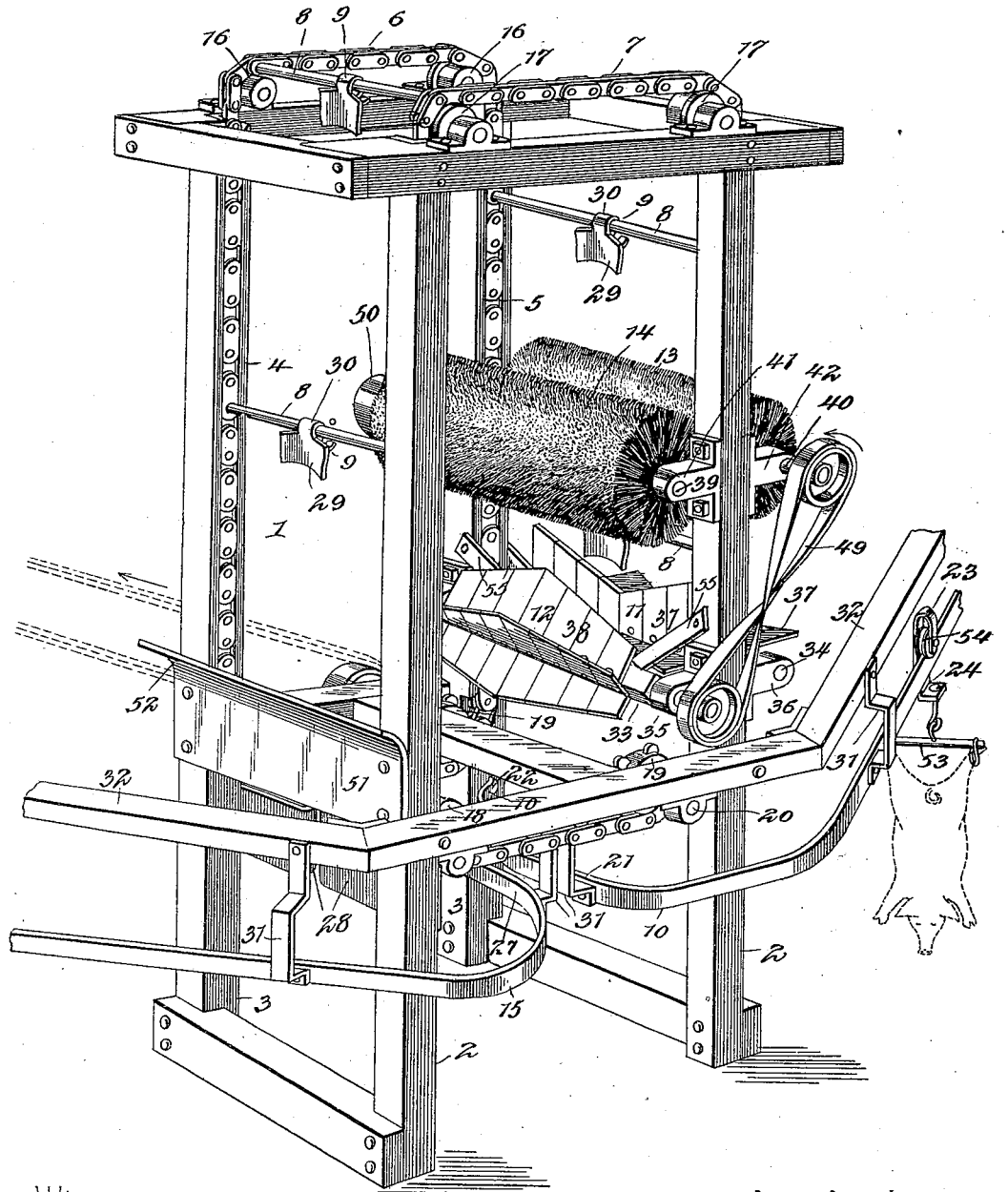

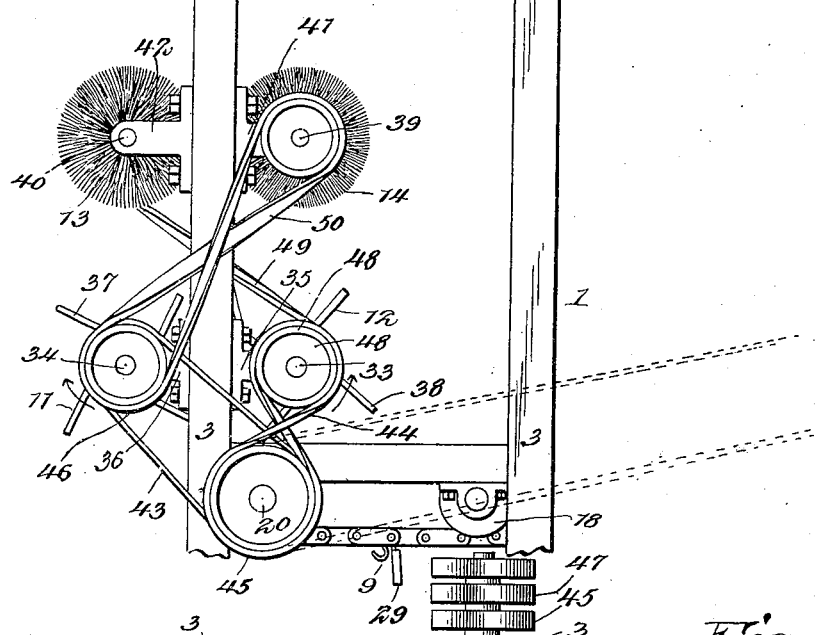

UNITED STATES PATENT OFFICE.

THOMAS LEBIEDZINSKI, OF CHICAGO, ILLINOIS.

HOG-SCRAPING MACHINE.

SPECIFICATION forming part of Letters Patent No. 663,449, dated December 11, 1900.

Application filed April 23, 1900. Serial No. 13,953. (No model.)

*To all whom it may concern:*

Be it known that I, THOMAS LEBIEDZINSKI, a citizen of the United States, residing at Chicago, in the county of Cook and State of Illinois, have invented a new and useful Hog-Scraping Machine, of which the following is a specification.

The invention relates to improvements in hog-scraping machines.

This object of the present invention is to improve the construction of hog-scraping machines and to provide a simple and comparatively inexpensive one capable of effectively removing the hair, dirt, bristles, and the like from the carcasses of hogs or other animals and adapted to take a hog from one track or rail, clean the carcass, and deliver the same automatically to another track or rail, whereby the operation of the machine will be entirely automatic.

The invention consists in the construction and novel combination and arrangement of parts hereinafter fully described, illustrated in the accompanying drawings, and pointed out in the claims hereto appended.

In the drawings, Figure 1 is a perspective view of a hog-scraping machine constructed in accordance with this invention. Fig. 2 is a vertical sectional view of the same. Fig. 3 is a side elevation of a portion of the machine. Fig. 4 is a horizontal sectional view illustrating the arrangement of the tracks or rails. Fig. 5 is a detail view illustrating the arrangement of the converging guides with relation to the end of the adjacent track.

Like numerals of reference designate corresponding parts in all the figures of the drawings.

1 designates a supporting-frame or main frame provided with corner-posts 2 and 3, located at the front and back of the frame and suitably connected at the top and bottom and provided at their upper portions with longitudinal grooves or ways 4 and 5, which receive the opposite flights of a pair of endless chains 6 and 7, which are connected at intervals by horizontal rods 8 and which form an endless carrier. The endless carrier is provided at the centers of its rods 8 with hooks 9, adapted to take the carcass of a hog automatically from a track or rail 10 and carry the carcass between a pair of rotary scrapers 11 and 12 and brushes 13 and 14 and then deliver the said carcass to another track or rail 15. The track or rail 10 is arranged at an inclination and extends downward toward the machine to carry the carcasses automatically into the machine, and the other track or rail 15 inclines downward from the machine to carry the carcasses away from the same, as hereinafter explained. The chains 6 and 7 extend vertically through the grooves or ways of the posts or uprights of the main frame and horizontally across the latter at the top and bottom of the endless carrier, and they are arranged on upper idlers 16 and 17, a pair of lower idlers 18, and a pair of lower sprocket-wheels 19, which are keyed or otherwise secured to a horizontal shaft 20. The horizontal shaft 20, which is journaled in suitable bearings of the main frame, is extended beyond the back of the same and is designed to be driven by a belt, as illustrated in dotted lines in Figs. 1 and 2 of the accompanying drawings. The guide-pulleys or idlers 16, 17, and 18 may be constructed in any suitable manner and may consist of sprocket-wheels to engage the links of the chains, if desired.

The track or rail 10 extends into the frame and is provided with an arm 21, disposed transversely of the endless carrier and having its terminal 22 extended and curved in the direction of the movement of the said endless carrier, and it is adapted to hold the loop 23 of a hanger 24 in position to be engaged automatically by one of the hooks 9 of the horizontal rods 8. The terminal 22 is provided with a projection 25, which is adapted to stop the hanger at the end of the track and hold the loop 23 exactly in the path of the hooks 9. The hook 9 is adapted, as clearly indicated in Fig. 2 of the accompanying drawings, to engage the loop of the hanger 24, and the endless carrier will then draw the said hanger off the track or rail and carry the carcass upward between the rotary scrapers and the rotary brushes. The carcass descends at the back of the frame, and the hanger is deposited on the curved end 26 of the arm 27 of the track or rail 15 by a tripping device, consisting of a pair of curved guides 28, located at opposite sides of the end 26 of the rail 15 in the path of an extension or arm 29 of the hook. The curved guides 28 prevent the hanger from swaying laterally, and they consist of plates or pieces secured to the inner faces of the uprights or posts 3 and extending inward, as clearly shown in Fig. 4 of the accompanying drawings. The arm or extension 29 depends from an eye 30 of the hook and is adapted to oscillate the latter and withdraw the same from the loop of the hanger 24, whereby the hanger will be deposited automatically upon the end 26 of the rail 15. The rail 15 inclines downward from its end 26, so that as soon as the hanger, with its load, is deposited upon the track it will slide down the same and be carried quickly away from the hook and out of the machine. The inner ends of the rails extend in opposite directions and the said rails are suspended by suitable brackets 31 from supporting-bars 32, the brackets being bowed outward between their ends to permit the hangers to pass them readily. The eye 30 of the hook forms a bearing through which passes the rod 8, whereby the hook is adapted to oscillate to release the hanger when it is engaged by the tripping device.

The scrapers 11 and 12 consist of resilient blades suitably fixed to a pair of horizontal shafts 33 and 34, journaled in suitable bearings 35 and 36 and located at the inner and outer sides of the uprights or corner-posts 2 of the main frame. The blades 37 of the scraper 11 gradually decrease in length from the ends of the scraper to the center thereof, as clearly illustrated in Fig. 1 of the accompanying drawings, while the blades 38 of the scraper 12 gradually increase in length from the ends of the scraper to the center thereof. The rotary brushes, which are located above the scrapers 11 and 12, are provided with shafts 39 and 40, journaled in suitable bearings 41 and 42, arranged at the opposite faces of the posts or uprights 2, similar to the bearings of the scrapers 11 and 12. Motion is communicated from the drive-shaft 20 to the scrapers 11 and 12 by means of belts 43 and 44, as clearly shown in Fig. 3 of the drawings. The belt 43, which extends upward and outward, is arranged on pulleys 45 and 46 of the shafts 20 and 34 and the belt 44, which is arranged on pulleys 47 and 48 of the shafts 20 and 34, is crossed, as shown. By this arrangement of belts the scrapers are driven in the direction of the arrows in Fig. 3. The brushes are connected with the scrapers by means of diagonally-disposed crossed belts 49 and 50, extending, respectively, from the inner scraper to the outer brush and from the inner brush to the outer scraper and mounted on suitable pulleys fixed to the ends of the shafts of the brushes and scrapers and located at opposite sides of the frame.

The frame is provided at the back with a horizontal guard 51, disposed horizontally and having an outwardly-curved upper edge 52 and adapted to guide the carcass and prevent the same from swaying. The guard is adapted to steady the carcass as it descends at the back of the machine, so that the hanger will be accurately deposited on the track or rail 15 when the hook is tripped. The hanger may be constructed in any suitable manner, and it is preferably provided with a horizontal bar 53, to which the hind legs of the animal are secured. A pulley 54 is mounted within the loop of the hanger and is grooved to run upon the tracks or rails.

In order to avoid injuring the legs of a hog and prevent the carcass from falling, the main frame is provided adjacent to the rotary scrapers with inwardly-extending guards 55, arranged in pairs and adapted to prevent the scraper-blade from coming in contact with the attached legs of the animals. The guards 55, which extend inward from the adjacent uprights 2 and 3, are spaced apart to provide intervening spaces for the legs of the carcass. The legs of the carcass pass upward through the space between the guards, which serve as shields and which also steady the legs and prevent them from swinging into the rotary scrapers should there be any tendency of the carcass to rotate.

It will be seen that as the scrapers and the brushes are rapidly rotated and as the carcass of the animal is moved in the opposite direction to the rotation of such cleaning devices the hair, dirt, and bristles will be effectively removed. It will also be apparent that the machine is adapted to take a hog automatically from one track or rail, clean the carcass, and deposit the same automatically on another track or rail that is adapted to carry the animal out of the machine and away from the same. Furthermore, it will be apparent that the machine is purely automatic in its operation, and that it is only necessary to feed the hogs to it by starting them down the inclined track or rail leading to the machine.

What is claimed is—

1. In a machine of the class described, the combination of an upright frame, rails extending into and out of the frame, an upright endless carrier arranged to take a carcass from one of the rails and deposit it on the other rail and provided with hooks arranged to pass over the rails, the said rails being arranged in the path of the hooks, whereby the latter will be adapted to automatically engage a hanger for carrying an animal, and a tripping device arranged in the path of the hooks and adapted to tilt or oscillate the same to cause the hanger to be deposited on the rail extending from the frame, substantially as described.

2. In a machine of the class described, the combination of a frame, an upright endless carrier mounted on the frame and provided with hooks, rails extending into and out of the frame and having their adjacent ends arranged in the path of the hooks and spaced apart, one of the rails being adapted to support a hanger in position to be engaged by the hooks, and a tripping device located adjacent to the other rail and adapted to disengage the hooks from the hangers to cause the latter to be deposited upon the latter rail, substantially as described.

3. In a machine of the class described, the combination of a frame, an endless carrier mounted on the frame and provided with hooks, rails extending to and from the frame and having their adjacent ends spaced apart and arranged in the path of the hooks, one of the rails being adapted to support a hanger in position to be engaged by the hooks, and a pair of guides located at opposite sides of the other rail and forming a tripping device adapted to engage the hooks to deposit the hanger upon the adjacent rail, substantially as described.

4. In a machine of the class described, the combination of a frame, an endless carrier provided with hooks having depending portions or arms and adapted to be oscillated, rails extending to and from the frame and located in the path of the hooks, one of the rails being arranged to support a hanger in position to be engaged by the hooks, and a tripping device arranged to be engaged by the depending portions or arms of the hooks to deposit the hangers on the other rail, substantially as described.

5. In a machine of the class described, the combination of a frame, an endless carrier provided with hooks, rails extending to and from the frame, cleaning devices located at one of the flights of the endless carrier, a guard, located at the opposite flight of the endless carrier to steady the carcasses, and the opposite guides forming a tripping device and located at opposite sides of the rail extending from the frame, substantially as described.

6. In a machine of the class described, the combination of a frame, rails extending into and out of the frame, a pair of scrapers mounted on the frame, a pair of rotary brushes arranged above the scrapers, and an endless carrier having one of its flights arranged between the scrapers and the brushes and arranged to carry a carcass from one rail between the scrapers and brushes to the other rail, substantially as described.

7. In a machine of the class described, the combination of a frame, an upright endless carrier, and a pair of rotary scrapers arranged at opposite sides of one of the flights of the endless carrier and composed of series of radially-disposed blades gradually varying in length, the blades of one of the scrapers gradually decreasing in length from the center to the ends and the blades of the other scraper being reversely arranged, substantially as described.

8. In a machine of the class described, the combination of a main frame, rotary scrapers, a carrier arranged to pass between the scrapers, and guards mounted on the main frame and arranged in pairs between the scrapers and spaced apart to form passages for the legs to protect the same, substantially as described.

9. In a machine of the class described, the combination of a frame, rails extending into and out of the frame, an endless carrier arranged adjacent to the rails and adapted to carry a carcass from one to the other, and devices located adjacent to the endless carrier for operating on the carcass, substantially as described.

In testimony that I claim the foregoing as my own I have hereto affixed my signature in the presence of two witnesses.

THOMAS LEBIEDZINSKI.

Witnesses:
    FRAK WINKLER,
    ALFRED WILKOSHESKY.